United States Patent [19]

Maus

[11] 4,093,311
[45] June 6, 1978

[54] ARRANGEMENT FOR CLAMPING VEHICLE WHEELS

[75] Inventor: Otfrid Maus, Darmstadt, Germany

[73] Assignee: Firma Carl Schenck AG, Darmstadt, Germany

[21] Appl. No.: 726,814

[22] Filed: Sep. 27, 1976

[30] Foreign Application Priority Data

Jan. 26, 1976  Germany .............................. 2602738

[51] Int. Cl.² ............................................. B25H 5/00
[52] U.S. Cl. .............................. 301/9 DH; 301/9 CN;
73/487; 144/288 A
[58] Field of Search .......... 301/9 CN, 9 DH; 73/487;
144/288 A; 403/13–14

[56] References Cited

U.S. PATENT DOCUMENTS

| 1,296,849 | 3/1919 | Putnam .......................... 301/9 CN X |
| 2,481,926 | 9/1949 | Henderson ........................ 144/288 A |
| 2,552,936 | 5/1951 | Chatterton ........................ 301/9 CN |
| 3,583,238 | 6/1971 | Haynes .................................. 73/487 |

FOREIGN PATENT DOCUMENTS

| 1,404,421 | 5/1965 | France .............................. 301/9 CN |
| 687,779 | 2/1953 | United Kingdom ................... 73/487 |
| 846,951 | 9/1960 | United Kingdom ................... 73/487 |
| 1,189,969 | 4/1970 | United Kingdom ................... 73/487 |

*Primary Examiner*—Allen N. Knowles
*Attorney, Agent, or Firm*—W. G. Fasse; W. W. Roberts

[57] ABSTRACT

A clamping arrangement for clamping vehicle wheels against a rotatable counter plate of a test apparatus. A clamping plate is adjustably movable toward the counter plate. Clamping pins are mounted on a pressure plate and adapted to extend into and engage a mounting hole in a vehicle wheel. In order to enable the rapid alignment of a vehicle wheel in the apparatus, while assuring positive clamping, guide pins to the pressure plate. The ends of the clamping pins are contoured to enable them to fit the mounting holes of different diameters.

9 Claims, 4 Drawing Figures

U.S. Patent  June 6, 1978  4,093,311
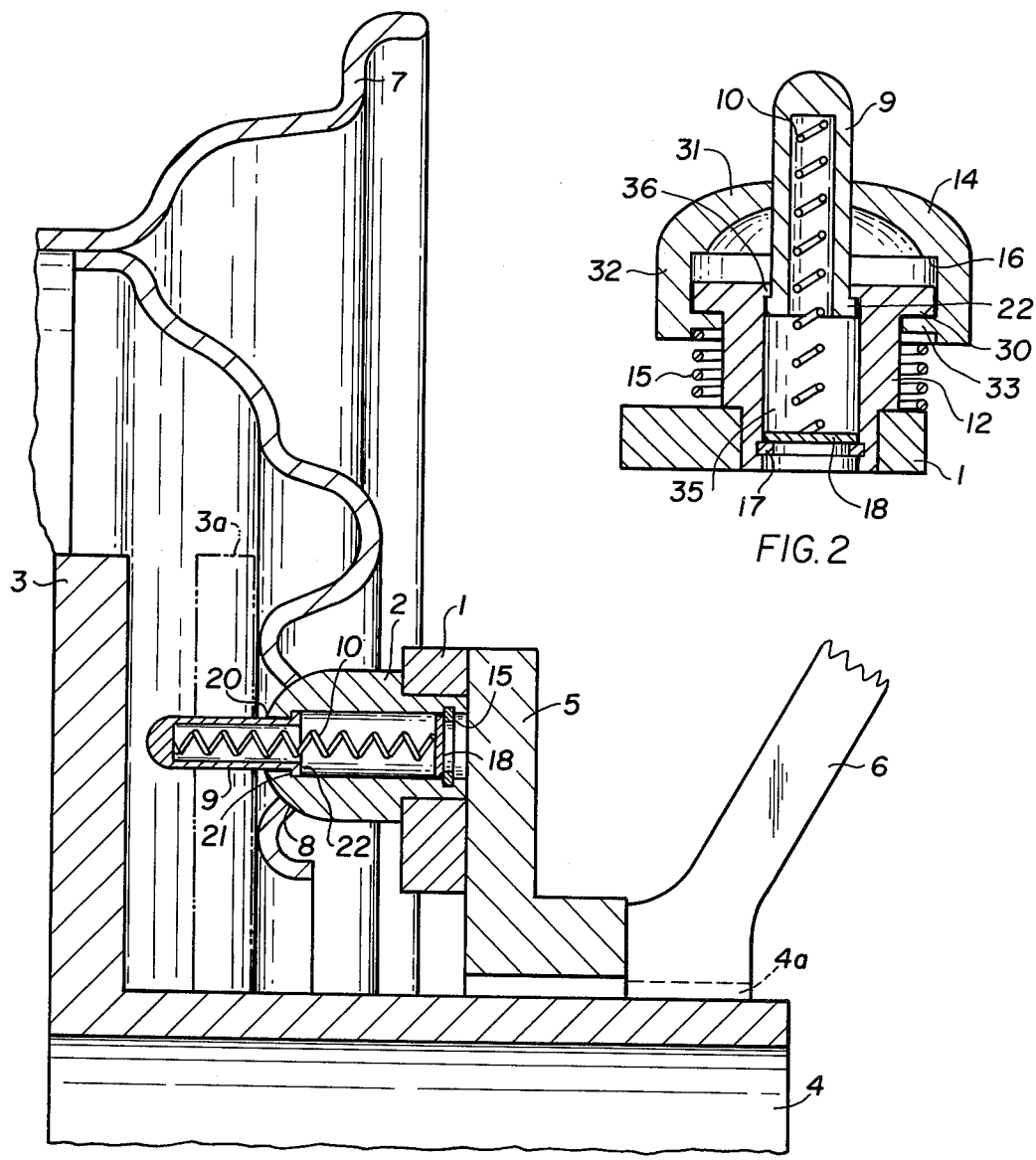
FIG. 1
FIG. 2
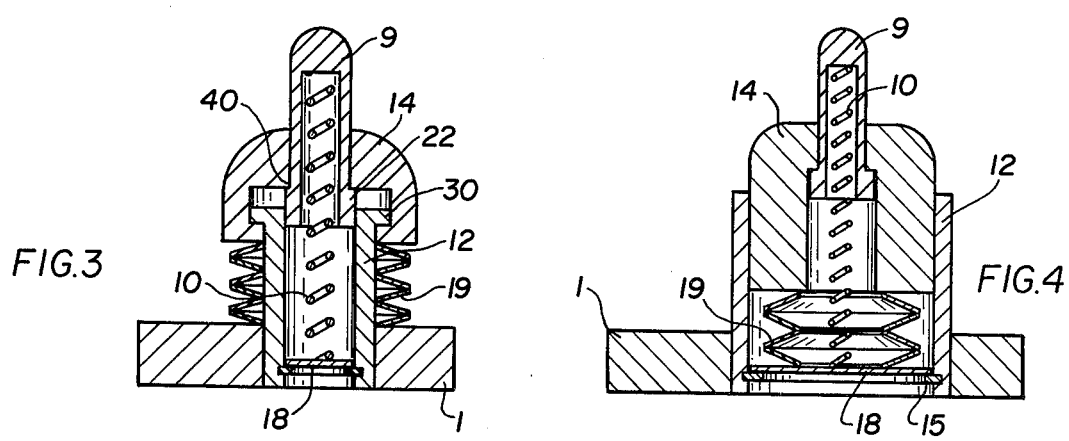
FIG. 3
FIG. 4

ARRANGEMENT FOR CLAMPING VEHICLE WHEELS

BACKGROUND OF THE INVENTION

This invention relates to an apparatus for mounting a vehicle wheel on a testing machine, such as an apparatus for balancing wheels. The invention is particularly directed to improvements in the clamping means employed in such an apparatus. The clamping means must assure the correct alignment and centering of a wheel to be tested or balanced in the apparatus. The wheel must also be positively clamped.

A vehicle wheel may be mounted in a balancing machine on a rotatable spindle, with a counter pressure plate being mounted on the spindle adjacent one side of the vehicle wheel. A clamping plate or the like is mounted on the spindle on the opposite side of the wheel. The clamping plate carries clamping pins, studs, or bolts adapted to engage the mounting holes of a vehicle wheel rim.

A universal clamping device for clamping vehicle wheels of different types to the clamping shaft of a testing apparatus is disclosed in German Utility Model Number 7,434,756. This publication discloses a testing apparatus having a tube shaped supporting member which is clampable to the shaft of a testing apparatus. A flat pressure surface is mounted on the tube shaped member. A clamping device is provided with conical studs or bolts for pressing the rim of a wheel against the pressure surface. The conical studs or bolts are adapted to engage the mounting holes of the wheel rim.

The conical studs or bolts of German Utility Model 7,434,756 are supposed to replace the respective means in German Utility Model 1,885,073. The studs or bolts in this latter publication require, due to their shape, a slotted counter pressure plate so that the pins could extend into the slots in the counter pressure plate in order to positively assure the proper mounting and drive of a wheel.

In accordance with German Utility Model 7,434,756 the clamping studs or bolts should have such a length that their conical portions at the free ends engage the mounting holes of the vehicle wheel rim in a pressing manner while still being spaced from the counter pressure plate. In order to provide clamping pins that are adaptable for the clamping of wheels having different diameters and different attachment holes, it is necessary to design the clamping studs or bolts with a maximum diameter suitable for the clamping of a vehicle wheel having mounting holes of the largest expected diameter. Thus, it is necessary that the clamping studs or bolts have such short contoured or conical ends, that it is not assured that the conical ends would positively find and extend through the mounting holes to engage the counter pressure plate with the wheel rim. Hence, the short contoured or conical ends on the clamping studs or bolts are not satisfactory from the standpoint of insuring positive and correct alignment of the mounting holes because a vehicle wheel may be mounted with the clamping pins engaging a portion of the wheel rim bowl rather than the mounting holes. This is unsatisfactory and such undesirable, faulty mounting of the vehicle wheel may make it impossible to properly balance the wheel since the wheel might take different positions during testing and during balancing.

If the conical portions of the clamping studs were to be extended, in order to assure proper alignment of the vehicle wheels in the testing apparatus, then the danger exists that the clamping pins will extend sufficiently through the mounting holes to engage the counter pressure plate before the wheel is positively clamped. This is particularly true for vehicle wheels having mounting holes of relatively large diameter.

OBJECTS OF THE INVENTION

In view of the foregoing, it is the aim of the invention to achieve the following objects singly or in combination:

to provide a clamping arrangement for vehicle wheels, especially for use in a test apparatus such as a wheel balancing apparatus, which overcomes the above problems of the prior art;

to provide a clamping arrangement for clamping wheels in a test apparatus, wherein the clamping pins or studs enable the positive clamping and centering of a vehicle wheel relative to a counter pressure plate, regardless of the size of the mounting holes, and to simultaneously assure with the clamping, a proper alignment of the vehicle wheels in the test apparatus; and to provide a clamping stud for clamping a vehicle wheel in a test apparatus, wherein the clamping stud or bolt has a first portion with a contoured surface adapted to engage the mounting hole of the vehicle wheel, and a second portion resiliently extending from the contoured portion for guiding the contoured portion into engagement with the mounting hole of a vehicle wheel rim so that any size conventional wheel may be properly handled in a balancing machine.

SUMMARY OF THE INVENTION

In accordance with the invention, there is provided a clamping bolt or stud for clamping a vehicle wheel in a test apparatus, wherein a guide pin extends resiliently from the clamping bolt, in order to assure the proper centering and alignment of the vehicle wheel, while also assuring the positive clamping of the vehicle wheel in the test apparatus regardless of the configurations of the wheel rim bowls and of the diameters of the mounting holes because the guide pins positively find the holes. Further, the invention prevents an undesirable contact between the counter pressure or backing means and the clamping bolts.

In one embodiment of the invention, the resiliently mounted guide pin has a diameter smaller than the shaft of the centering bolt. This arrangement is particularly useful in the mounting of wheels having small diameter mounting holes. In a further embodiment of the invention, the centering bolt has a cylindrical body and a contoured face portion between said cylindrical body and the resilient guide pin. The contoured face portion is shaped to conform to the respective contour of the mounting holes of the vehicle wheel rims to positively mount the vehicle wheel rim in a test apparatus whereby the positive drive of the wheel is assured.

In still aother embodiment of the invention, the clamping bolt has two portions or members, one is fixed to a base of the clamping device proper and the other is slidable over the fixed member. In this arrangement, the guide pin extends through the movable member of the clamping bolt. In addition, the movable member of the clamping bolt has a contoured surface for engaging the mounting holes of the vehicle wheel rim. This arrangement is particularly useful for the clamping of vehicle wheel rims having large diameter mounting holes, to thereby assure the positive centering and driving of the wheel rim.

In a still further embodiment of the invention, the guide pin, as well as at least a contoured portion of the clamping bolt, are both resiliently mounted, with respect to an element of the clamping device proper. This arrangement provides the particular advantage, that positive support, clamping and drive of the wheel is assured, even though incompletely planed wheel dishes or rims are involved.

BRIEF FIGURE DESCRIPTION

FIG. 1. is a longitudinal sectional view of a portion of a clamping arrangement in accordance with the invention above the axis thereof, and illustrating a vehicle wheel mounted thereon;

FIG. 2 is a sectional view of a modification of the clamping bolt of the apparatus of FIG. 1;

FIG. 3 is a sectional view of a further modification of the clamping bolt of the apparatus of FIG. 1; and FIG. 4 is a sectional view of a still further modification of the clamping bolt of the apparatus of FIG. 1.

DETAILED DESCRIPTION OF PREFERRED EXAMPLE EMBODIMENTS

FIG. 1 illustrates a clamping arrangement for clamping a vehicle wheel rim 7 in a test apparatus, such as a wheel balancing apparatus. The test apparatus includes a rotating spindle 4, and a backing or counter pressure plate 3 extends transversely from the spindle 4. A clamping means such as a plate 5 is axially slidable on the spindle 4. The plate 5 carries base elements 1 on the side of the plate facing toward the counter pressure plate 3. The base members 1 are radially slidable on the clamping plate, by any conventional means such as radially extending guide grooves to adapt the clampig apparatus for clamping any of a number of wheels of different sizes. Suitable clamping means are provided for clamping the base members 1 at any desired radial position.

As illustrated in FIG. 1, clamping bolts 2 are mounted on the base member 1, and extend toward the counter pressure plate 3. The free end of the clamping bolt 2 is shaped to conform to the contours of the mounting holes 8 of a vehicle wheel rim 7 to be tested. For example, the clamping bolt 2 may have a conical or rounded free end.

In order to facilitate the use of the clamping apparatus, a quick action clamp 6 may be provided to rapidly clamp a wheel rim against the counter pressure plate. The quick clamping arrangement may be of any conventional type, and is hence not illustrated in detail. For example, the spindle 4 may be provided with external threads 4a, on which the quick clamping device 6 is threaded, and the threads may have axially extending slots for the rapid adjustment of plate 5. The shown clamping means may be replaced by other arrangements for moving the clamping plate 5.

FIG. 1 illustrates in solid lines the relative positions of the elements when a vehicle wheel is first inserted in the apparatus. In this position the wheel rim is not yet firmly clamped in position. The dash dotted lines 3a of FIG. 1 illustrate the relative position of the counter pressure plate 3 with respect to the vehicle wheel, when the wheel is firmly clamped.

The mounting holes 8 of the vehicle wheel rims of different types may have different diameters. The clamping bolt 2, therefore, has a contoured free end, such as a conical end or a rounded end as illustrated, whereby the end of this pin may positively engage a mounting hole and serve to center the wheel in the testing apparatus. To facilitate the location of the mounting holes 8 relative to the clamping bolts 2 or vice versa, according to the invention, a guide pin 9 is resiliently mounted at the free end of the clamping bolt 2 facing toward the counter pressure plate or backing 3. For example, the clamping bolt 2 may have a central aperture 20 through which the guide pin 9 extends. The aperture 20 forms a shoulder 21 in the clamping bolt 2. The shoulder 21 engages a radially outwardly extending flange 22 on the guide pin 9, to inhibit removal of the guide pin. A holder ring 15 is secured by conventional means in a groove in the other end of the central aperture of the clamping bolt 2, and a spring 10 extends between a disc 18 held by the holding or spring ring 15, and the guide pin 9. The spring 10 resiliently urges the guide pin 9 toward the pressure plate 3, but permits the guide pin 9 to retract into the bolt 2 when the wheel rim is tightly clamped against the backing 3.

The guide pin 9 readily locates the mounting holes 8 of a vehicle wheel to be mounted in the apparatus, whereby the guide pins 9 will first extend through the mounting holes after the clamping pins 9 are retracted. In addition, the ends of these bolts 2 are shaped to fit the contours of the mounting holes of the vehicle wheels, regardless of the size of the holes.

FIG. 2 illustrates another embodiment of the clamping bolt 2 comprising a clamp support 12 fixedly mounted on the base member 1. A tapered adaptor 14 is resiliently held on the free end of the clamp support 12. For example, the clamp support may comprise a tubular element having one end threaded in the base member 1, with a radially outwardly extending flange 30 on the other end. The adaptor 14 has a contoured outer surface 31 for engaging the mounting holes 8 of the vehicle wheel rims 7. The cylindrical base of the adaptor 14 has a radially inwardly extending flange 33 engaging the flange 30 of the support 12. In addition, the adaptor 14 has a internal shoulder 16 spaced from the radially inwardly extending flange 33 a distance greater than the thickness of the flange 30 of the clamp support, so that the adaptor 14 may move from the position illustrated with the flange 33 engaging the flange 30, to a position in which the flange 30 engages the internal shoulder 16 of the adaptor 14. A spring 15 surrounds the clamp support 12, between the adaptor 14 and the base member 1, whereby the adaptor 14 is urged away from the base member 1.

In the arrangment of FIG. 2, the clamp support 12 is also provided with an axially extending internal aperture 35 having a radially inwardly extending flange 36 at its end away from the base member 1. The flange 22 of the guide pin 9 engages the flange 36, in order to prevent the removal of the guide pin 9 from the device.

In FIG. 2, the spring 15 is preferably selected to have a spring deflection or compression such that the spring deflection or compression of the spring 10 is still sufficiently large to urge the cylindrical guide pin 9 against the counter pressure plate 3 when the shoulder 16 of the adaptor 14 engages the flange 30 of the clamp support 12. The arrangement of FIG. 2 enables the fast and certain clamping of wheel rims having mounting hole diameters that differ greatly, without the necessity for providing different clamping pins.

In the embodiment of the invention, as illustrated in FIG. 3, the clamp support 12 is not provided with a radially inwardly extending flange as in the embodiment of FIG. 2. Instead, the flange 22 of the pin 9 engages the inner edge of the aperture 40 in the adaptor 14. This arrangement provides the advantage that the guide pin 9 may extend out of the adaptor 14 for a length larger than in the arrangement of FIG. 2.

In addition, in the arrangement of FIG. 3, a series of plate springs 19 or so called Belleville springs are located between the base member 1 and the adaptor 14. The springs 19 operate in the same manner as the coil spring 15 of FIG. 2.

FIG. 4 shows a still further embodiment of the invention. The clamp support 12 is tubular, and the contoured adaptor 14 is mounted to move axially within the clamp support tube 12. The guide pin 9 is resiliently mounted in the ends of the adaptor 14 in the same manner as in the arrangement of FIG. 3. The Belleville springs 19 extend between the disc 18 and the internal side of the adaptor 14, to bias the adaptor 14 outwardly of the base member 1. The adaptor 14 may be restrained from removal from the clamp support tube 12 by any conventional means, for example, by securing the springs 19 to the disc 18 and to the internal side of the adaptor 14, and by providing means for holding the disc 18 in the clamp support tube 12, for example, by a spring ring 15.

The arrangement of FIG. 4 provides the particular advantage that the Belleville springs 19 as well as the spiral spring 10 are enclosed, whereby abrasion and erosion of these elements, due to dirt or the like, is substantially eliminated.

Although the invention has been described with reference to specific example embodiments, it will be appreciated, that it is intended to cover all modifications and equivalents within the scope of the appended claims.

What is claimed is:

1. An apparatus for clamping a vehicle wheel rim having mounting holes therein to hold the respective wheel in a rotatable position, comprising rotatable backing means, a clamping device including wheel centering means for engaging a mounting hole in said vehicle wheel rim, said wheel centering means comprising centering bolt means secured to said clamping device, said centering bolt means extending toward said backing means, guide pin means extending from said centering bolt means also toward said backing means, biasing spring means cooperating with said guide pin means for yieldingly urging said guide pin means toward said backing means, said centering bolt means comprising a first bolt portion rigidly mounted to said clamping device and a second bolt portion operatively connected to said first bolt portion, said second bolt portion having a contoured surface facing toward said backing means for engaging a mounting hole, said centering bolt means further comprising a central, axially extending channel therein, said guide pin means and said biasing spring means being located in said central, axially extending channel of said centering bolt means, said guide pin means and said channel comprising cooperating shoulder means inhibiting the removal of said guide pin means from said channel, said spring means urging said guide pin means toward a shoulder engaging position.

2. The clamping apparatus of claim 1, wherein said guide pin means has a smaller diameter than that of said centering bolt means.

3. The clamping apparatus of claim 1, wherein said first bolt portion of said centering bolt means is cylindrical and wherein said second bolt portion has a free end, said guide pin means extending out of said free end of said centering bolt means.

4. The clamping apparatus of claim 1, further comprising means movably securing said guide pin means in said central, axially extending channel of said centering bolt means.

5. The clamping apparatus of claim 4, wherein said clamping device includes a base supporting said centering bolt means, said apparatus comprising further spring means for separately and resiliently supporting at least one of said first and second bolt portions of said centering bolt means relative to said base.

6. The clamping apparatus of claim 1, wherein said second bolt portion of said centering bolt means has a central aperture communicating with said central, axially extending channel, said guide pin means extending through said central aperture, toward said backing means.

7. The clamping apparatus of claim 1, wherein said first bolt portion is a tubular member of said centering bolt means, said tubular member being fixedly mounted to said clamping device, said second bolt portion sliding in said tubular member.

8. The clamping apparatus of claim 1, wherein said cooperating shoulder means comprise a first flange and a second flange, said first flange extending radially outwardly, said second flange extending radially inwardly for engaging said first flange, said apparatus comprising further spring means operatively arranged to urge said first and second flange toward each other.

9. The clamping apparatus of claim 8, wherein said first bolt portion is a hollow bushing, wherein said guide pin means has an axially extending dead end hole axially aligned with said hollow bushing to confine said central, axially extending channel, said biasing spring means being located in said hollow bushing and in said dead end hole of said guide pin means.

* * * * *